Aug. 8, 1933.  D. HEAD  1,921,121

SHOCK ABSORBER

Filed Dec. 23, 1931  3 Sheets-Sheet 1

Inventor,
Drew Head,

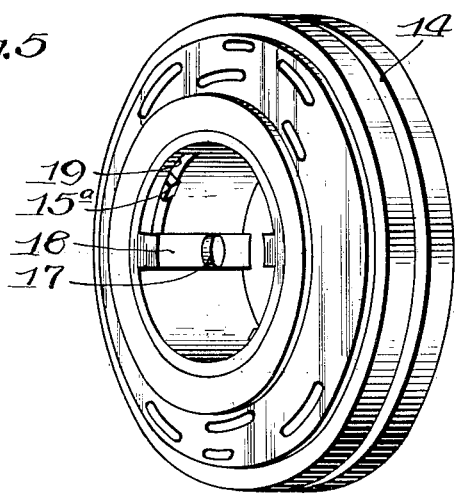
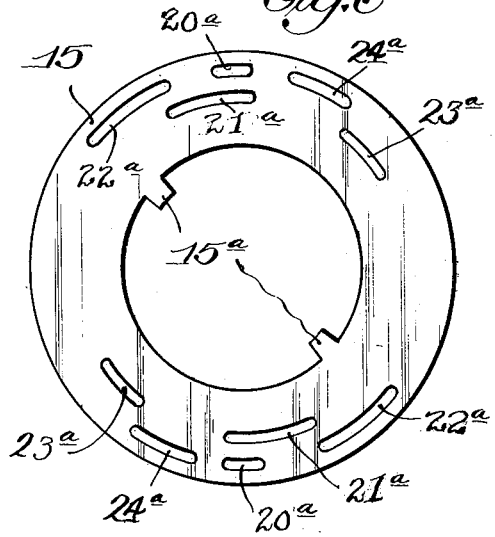
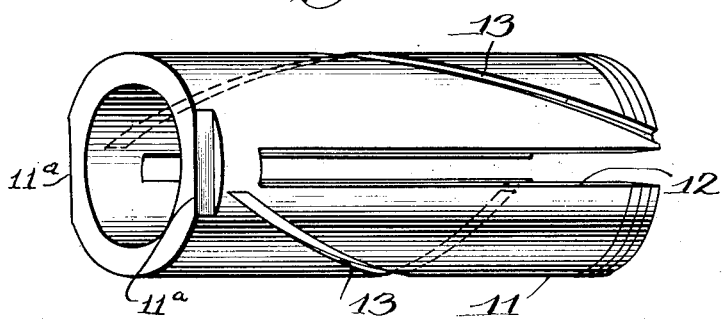
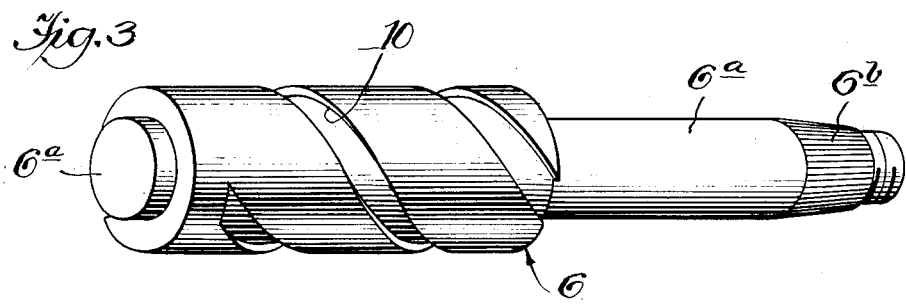

Aug. 8, 1933.                D. HEAD                1,921,121
                          SHOCK ABSORBER
                     Filed Dec. 23, 1931       3 Sheets-Sheet 3
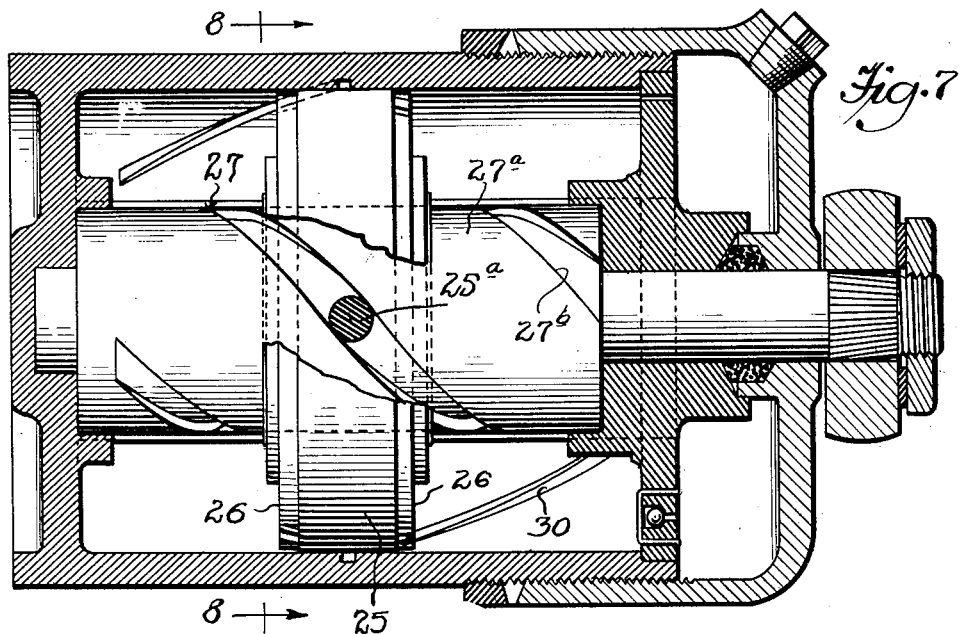
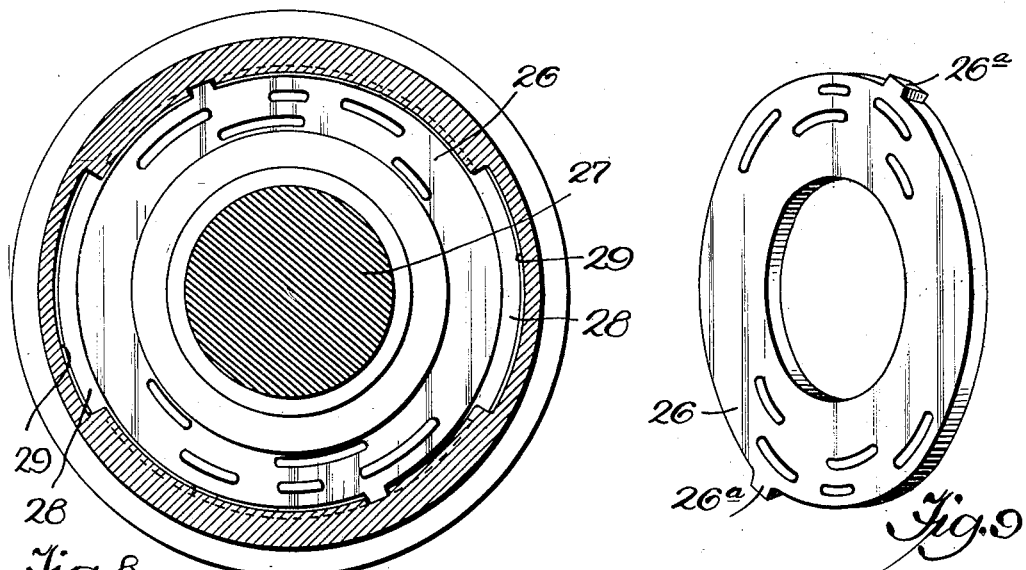
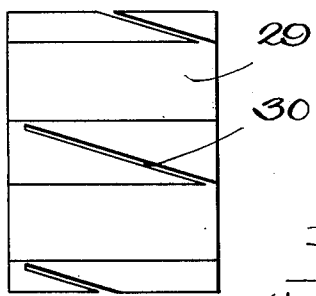
Inventor
Drew Head
Witness:

Patented Aug. 8, 1933

1,921,121

UNITED STATES PATENT OFFICE 1,921,121

SHOCK ABSORBER

Drew Head, Chicago, Ill.

Application December 23, 1931. Serial No. 582,694

8 Claims. (Cl. 188—88)

This invention relates to improvements in shock absorbers for motor vehicles, and more particularly to devices for checking the spring action during or following the passage of the vehicle over an uneven road surface or a rough spot in an otherwise smooth pavement.

Shock absorbing devices are well known in the automotive art, and hence any novelty resides in a design or construction calculated to accomplish a new and improved function or action, which in the present instance may be described as an automatic adjustment or regulator of the checking or snubbing capacity of the device to the road conditions, as well as to the weight of the load.

It is a well known fact that shock absorbers largely determine the riding qualities of a vehicle, and to the extent that they resist and retard the spring action with a minimum of discomfort to the occupants. Varying road conditions and number of passengers carried manifestly affect the spring action, and hence no single adjustment of the shock absorber will cover the full range of factors affecting riding comfort. For example, considerably more freedom of spring action is permissible in travelling on smooth roads than on rough roads, or with a light load than a heavy load. Consequently a properly designed shock absorbing device should be self-adjusting to meet the varying conditions of travel. Thus during travel over relatively smooth roads the resistance offered to free spring action would be correspondingly less than that offered during travel over rough roads with the load carried being an additional factor regardless of road conditions.

The shock absorber embodying the novel features of the invention is of the hydraulic type consisting generally of a piston working against a body of oil within the piston cylinder, there being passages connecting the spaces on opposite sides of the piston to permit its movement, the rate of which is governed by the size of the passages, as regulated and controlled by the mechanism which embodies the present invention as disclosed in the accompanying drawings, in which Figure 1 is a general view in longitudinal section through the device;

Figure 3 is a perspective view of the main shaft;

Figure 4 is a perspective view of the sleeve surrounding the shaft;

Figure 5 is a perspective view of the piston;

Figure 6 is a view in elevation of one of the valve discs on the piston;

Figure 7 is a view in longitudinal section of a modified form of the device;

Figure 8 is a view in cross section taken on line 8—8 of Figure 7;

Figure 9 is a perspective view of one of the valve discs on the piston; and

Figure 10 is a diagrammatic view showing the inner surface of the cylinder developed into a plane.

Figure 1:
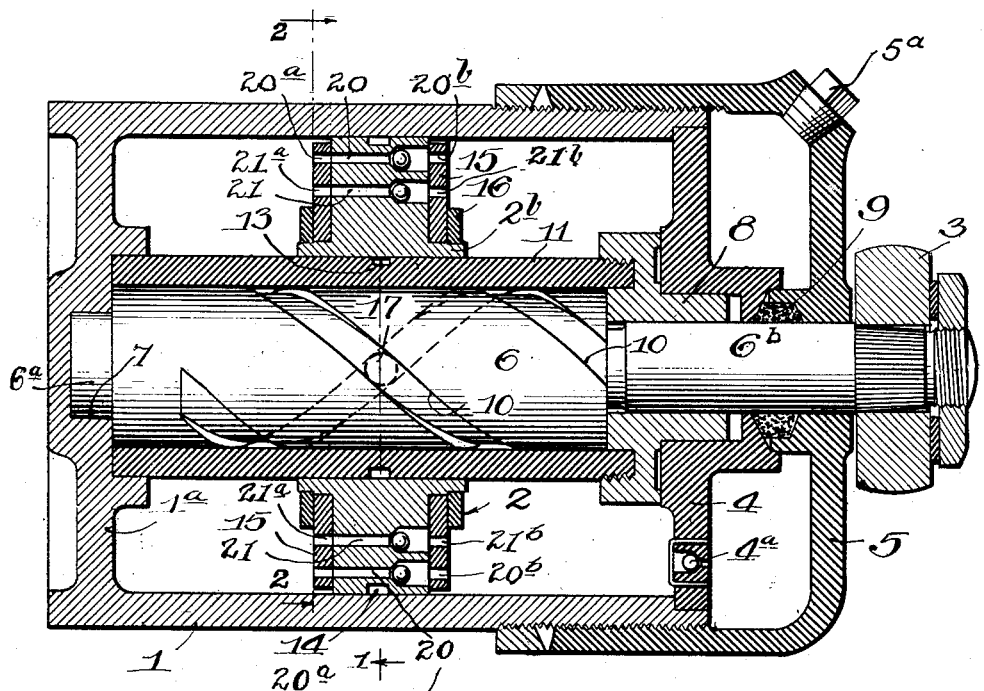

As common in shock absorbers, the main portion or cylinder 1 of the device is mounted on the frame of the vehicle above each axle and the arm 3 connected at its free end with the axle through the medium of a vertical link (not shown).

The cylinder 1 houses a piston 2 adapted to shift axially of the cylinder, the space on either side being filled with a liquid, usually a suitable grade of oil. The cylinder has a solid head $1^a$ at one end and a separate head 4 at the other end, and fitting over the latter is a screw cap 5 forming an auxiliary chamber between the same and the head 4 and connected with the main cylinder by a valved passage $4^a$ through the head, having a ball check adapted to close the same against the outward flow of the liquid. A plug $5^a$ in the cap serves for filling the auxiliary chamber with oil under pressure.

The arm 3 is mounted at the outer end of a shaft 6 extending axially of the casing and journalled in the heads of the cylinder. The inner end of the shaft has a pilot bearing $6^a$ socketed in a bearing 7 in the solid head of the cylinder, while its outer end portion has the form of a shank $6^b$ of reduced diameter which is journalled in a bearing bushing 8 fitting in a socket in the inner face of the head 4, and a packing gland 9 in the outer wall of the cap 5. The main body of the shaft extends practically the full length of the interior of the cylinder and cut in its surface are two relatively shallow grooves 10, 10 of such a pitch that the piston will be shifted on the bearing sleeve a substantial distance in either direction from its normal center position with the throw of the arm 3, which may be assumed to be something like 100°, or say 60° in one direction and 40° in the other direction from its normal position.

Extending lengthwise of the shaft and closely surrounding it is a sleeve 11 (Figure 4) having one end squared slightly as at $11^a$, $11^a$, and adapted to fit within a similarly shaped socket in the head end of the cylinder, while the other end is adapted to be assembled in threaded connection with the bushing 8 as shown in Figure 1. The sleeve is slotted lengthwise and on opposite sides, the two slots 12, 12 cut to a substantial width extending practically the full length from one end to the other. In addition to the slots 12, 12, there is cut in the outer surface of the sleeve a pair of corresponding helical grooves 13, 13 located symmetrically on opposite sides of the slots 12, 12 and comparatively narrow and shallow, with a relatively large pitch, that is, each groove describes a helix of only about 60° in passing the length of the sleeve.

The piston 2 is directly mounted upon the sleeve 11 and on which it has bearing for sliding movement lengthwise thereof. The piston has the form of a thick metal ring bearing at its periphery against the cylinder wall and grooved as at 14 to effect an oil seal, although other sealing means such as an expansible piston ring may be used. The central portion of the piston is somewhat thicker in order to form hub-like extensions 2$^b$, 2$^b$ which provide bearings for a pair of valve discs 15, 15, one on each side of the piston, these discs being held in place but free to rotate on their bearings by locking rings 16, 16 applied to the ends of the hub extensions.

As shown more clearly in Figure 5, the piston has a pair of oppositely disposed square keys or lugs 18, 18 on its internal bearing face axially and corresponding in width and thickness to the grooves 12, 12 in the sleeve 11. Indeed, these keys fit into these grooves allowing the piston to slide back and forth on the sleeve, but preventing its rotation relative thereto. Furthermore at the mid-point of the keys is a pair of cylindric lugs 17, 17 which project beyond the inner faces thereof a distance equal to the depth of the helical grooves 10, 10 in the shaft 6. Thus when the parts are assembled as in Figure 1, the keys 18 ride in the longitudinal slots in the sleeve 11 while the circular lugs project beyond and engage the helical grooves 10, 10 in the shaft.

And somewhat similarly, the valve discs 15, 15 have a pair of diametrically opposed lugs 15$^a$ on their internal edges projecting inwardly and adapted to extend through corresponding pairs of circumferentially disposed slots 19, 19 cut through the portions 2$^b$ of the piston which form the bearings for the disc and extending from each of the lugs 18 in a clockwise direction and through an arc of about 45°, as clearly shown in Figure 5. Moreover these lugs are long enough to project beyond the slots, so that their tip ends engage and ride in the helical grooves 13, 13 on the surface of the sleeve 11 (Figure 4).

And finally there are provided in the piston a series of transverse passages through the main body thereof, their purpose being to permit the liquid to pass from one side of the piston to the other as it slides in both directions, the resistance offered by the liquid to the piston meaning the cushioning or shock absorbing effect produced by the devices. Manifestly, the rate of movement of the piston is governed by the rate of flow of the liquid through the port or ports and the flow in turn is dependent upon the size of the port or if there are more than one port, the number and size of the ports that are open in any given position of the piston. Thus if the piston is provided with two groups of passages for controlling the flow through the same in both directions, and these ports can be increased or decreased in number as the displacement of the piston from its normal position is increased by proportional depression of the springs, it becomes possible then to automatically increase or decrease the snubbing or shock absorbing capacity of the device in proportion to the weight and/or severity of the deflection of the springs under a given load. This is the function of the herein disclosed combination of elements, and their co-acting in accomplishing this end will be understood from the following:

Extending transversely through the piston are sets of ports or passages for the passage or escape of the fluid through the same in its movement within the cylinder as governed by the defections of the arm under the depression and rebound of the spring supported weight. There are two sets of passages, one for the liquid flow in each direction as can be readily identified by the location of the ball checks with which each passage is provided, so that liquid can pass in but one direction. Moreover, the passage constituting one set may be divided into groups located diametrically opposite each other so as to equalize the pressures. Thus there is a set of six (6) passages divided into corresponding groups of three (3) ports each, 20, 20, 21, 21 and 22, 22 for controlling the flow of liquid through the piston from left to right or during the displacement of the piston to the left as indicated by the ball checks at the right or discharge ends of the passages as shown in Figure 1, each port having a complementary port diametrically opposite. Likewise, there is a set of four ports divided into groups of two each, 23, 23 and 24, 24 for passing the liquid from the right to left side of the piston, as the same shifts to the right, there being preferably one less port for the movement in this direction as it is assumed to correspond to the rebound of the spring weight which is more severe than the initial depression of the springs when a rough place or hump is encountered.

Figure 2:
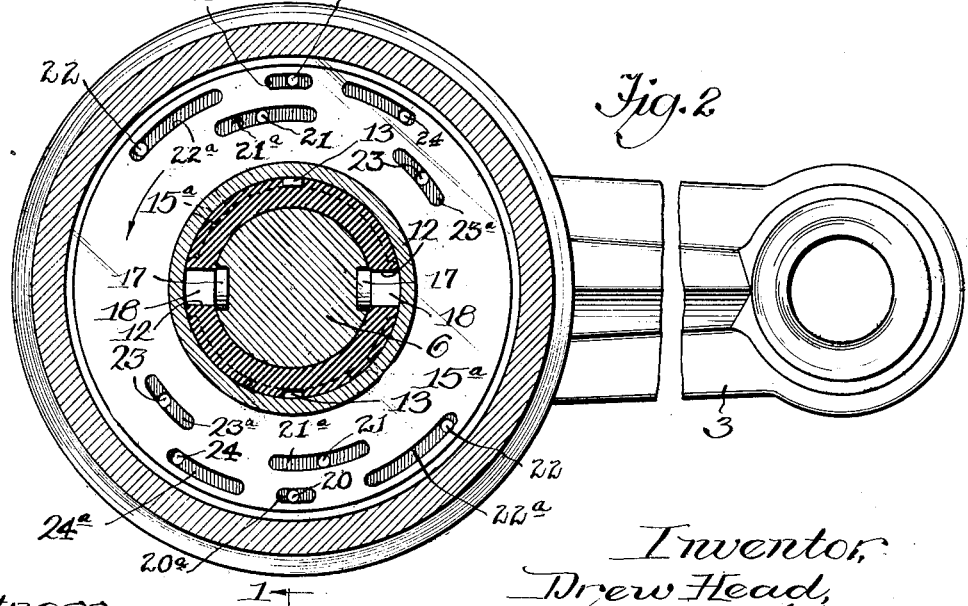
Figure 2 is a view in cross section as taken on line 2—2 of Figure 1.

In the valve plates 15, 15 are corresponding pairs of slots 20$^a$, 20$^b$, 21$^a$, 21$^b$, etc., coacting with each of the ports 20 to 22, respectively, these slots uncovering and closing the opposite ends of their associated ports, as the plates revolve relative to the body of the piston in its sliding movement in the cylinder. Considering one group of ports 20, 21 and 22 and their respective slots 20$^a$, 20$^b$, 21$^a$, 21$^b$, and 22$^a$, 22$^b$ (Figure 2) it will be observed that the slot 20$^a$ on the left side of the piston is relatively short, and that the port 20 is located midway between its ends when the piston is in its central or normal position; that slot 21$^a$ is approximately twice as long and the port is located midway thereof, and finally the slot 22$^a$ is the same length as the slot 21$^a$, but the port 22 is positioned at its extreme end and to the left (Figure 2). A similar arrangement is followed as to ports 23 and 24 and the corresponding slots 23$^a$ and 24$^a$ in the plates. Thus slot 23$^a$ is the shorter and its port 23 is positioned centrally thereof, while slot 24$^a$ is longer and its port 24 is normally located at its right end.

Now assuming that under the deflection of the vehicle springs, the arm 3 is depressed or swung downwardly through a small angle, thereby rotating the shaft 6 with it, the rotation of the latter being transmitted to the piston through the helical groove 10 and lug 17 connection to shift the piston to the left, this movement of the piston being accompanied by a relative rotation of the valve plates 15, 15 in a counter-clockwise direction from the position shown in Figure 2, as indicated by the arrow. Now the depression of the arm may be just enough to turn the valve plates without closing off any of the ports 20, 21 or 22, or it may be enough to close off the shorter slot 20ª since only a relatively small annular displacement of the valve plates is necessary to close the port. Thus it will be seen that for travel over relatively smooth pavements, the resistance offered to the spring deflection is the smallest since the fluid can pass through the three open ports in the piston. But through the arm be depressed through a greater angle, the short slot 20 would be carried beyond the port closing it off, thus leaving the ports 21 and 22 open to the passage of the fluid, and finally in case of a violent deflection of the springs which would carry the arm through its maximum depression, the slots 20 and 21 would close one after the other in rapid succession, leaving only the port 22 open for the passage of the liquid and a correspondingly rapid increase in the resistance offered by the piston. The ports 23 and 24 act in the same manner during the rebound which always follows the depression of the springs, and is usually more severe and therefore requires a more positive snubbing. Hence only the two ports are used instead of three. Thus when the rebound occurs, the arm 3 is thrown downwardly and the piston travels in the opposite direction, being resisted by the liquid flowing through the ports 23 and 24 from right to left, first through both ports and then through the one port 24, the other port 23 having been closed at about the mid-point of the rebound.

Thus for average smooth road travel the shock absorbing capacity of the device remains within a normal range or central zone, with little change, but as soon as increased roughness in road conditions is encountered as evidenced by increased deflection of the springs, the shock absorbing devices then automatically adjust themselves to those conditions by increasing the resistance offered to the deflection and rebound of the vehicle body. So also the weight of the spring supported load as well as road conditions are taken into account as the weight increases the amplitude of deflection and rebound, and therefore demands increased snubbing action to promote riding comfort. In short, the advantage of the devices herein described is the automatic adjustment of their shock absorbing qualities to the existing road conditions so that excessive snubbing action will not be experienced when unnecessary, and, vice versa, increased snubbing action will be available when rough roads or severe bumps are encountered.

Figures 7 to 10 illustrate a modified construction in which the piston 25 and its valve plates 26, 26 have operative connection with slots formed on the internal surface of the cylinder surrounding the piston, rather than with slots in a cylindric surface surrounded by the piston, namely the sleeve 11 with its slots 12 and 13 (Figure 4). In short, the sleeve 11 is omitted entirely and the grooved portion 27ª of the shaft 27 on which the piston slides is increased in diameter to take the same size of piston with its lugs 25ª engaging helical slots 27ᵇ, 27ᵇ as before.

To prevent the piston from turning with the shaft, wide lugs 28, 28 are formed diametrically opposite each other on the periphery of the piston and engaging corresponding keyways 29, 29 extending lengthwise of the cylinder wall. Between these keyways in the cylinder wall are cut helical slots 30, 30 which correspond to the slots 13, 13 in the sleeve 11 of the previous form, and these slots are engaged by pairs of lugs 26ª, 26ª on each of the valve plates whereby the same are revolved on the piston as it shifts in the cylinder, thereby controlling the passages through the piston in the same manner heretofore described.

As a practical matter then, this modification is merely a transfer of the lugs and grooves which control the movement of the piston and valve plates from their internal to their outer peripheries, and while the action is not altered, the construction is somewhat simplified by the elimination of parts, although this advantage is offset in a degree by the increased leakage around the piston since one of the parts omitted by necessity is a piston ring.

I claim as my invention:

1. A shock absorber comprising a cylinder mounted on the body of the vehicle, a piston in said cylinder adapted for movement axially thereof, a shaft extending axially of said cylinder and having operative connection exterior said cylinder with the axle of the vehicle, said piston having connection with said shaft through the medium of a pin and helical slot connection whereby rotation of said shaft imparts an axial displacement of said piston in said cylinder, the spaces in said cylinder on opposite sides of said piston being filled with a liquid and said piston having groups of passages therethrough for the passage of said liquid from one side to the other thereof, a valve plate mounted on said piston and having slots for successively opening and closing said passages, and means for rotating said valve plate relative to said piston whereby the combined area of said passages is maintained proportional to the displacement of said piston from its normal position.

2. A shock absorber comprising a cylinder mounted on the body of the vehicle, a piston in said cylinder adapted for movement axially thereof, a shaft extending axially of said cylinder and having operative connection exterior said cylinder with the axle of the vehicle, said piston having connection with said shaft through the medium of a pin and helical slot connection whereby rotation of said shaft imparts an axial displacement of said piston in said cylinder, the spaces in said cylinder on opposite sides of said piston being filled with a liquid and said piston having groups of ports therethrough for the passage of said liquid in both directions, a pair of valve plates mounted on said piston and having slots for opening and closing said ports in a predetermined order, and means for rotating said valve plates relative to the piston whereby the volume of liquid passing through said ports is decreased in proportion to the displacement of said piston from its normal position.

3. A shock absorber comprising a cylinder adapted to be mounted on the frame of a vehicle, a shaft extending axially of said cylinder and operatively connected exterior thereof with the vehicle axle, a piston mounted within said cylinder and having sets of ports extending therethrough for connecting the spaces on opposite sides thereof, said spaces being filled with a liquid acting to oppose the movement of said piston, annular valve plates journalled on said piston and each having a series of slots disposed in radial alignment with one set of ports in said piston, means for imparting a relative rotation between said piston and valve plates whereby each of the latter varies the combined area of its coacting set of ports to regulate the effective pressure exerted by the liquid to resist the movement of the piston in both directions and proportional to its axial displacement from its normal position, and means whereby the pressure exerted against the piston is transmitted to the shaft.

4. A shock absorber comprising a cylinder adapted to be mounted on the frame of a vehicle, a shaft extending axially of said cylinder and operatively connected exterior thereof with the vehicle axle, a piston mounted within said cylinder and having operative connection with said shaft to shift with the turning thereof, said piston having sets of ports connecting the spaces on opposite sides thereof, said spaces being filled with a liquid acting to oppose the movement of said piston, annular valve plates journalled on said piston and bearing against opposite faces thereof, each having a series of slots disposed in radial alignment with one set of ports in said piston, and means for rotating said valve plates on said piston whereby each of the same varies the combined area of its coacting set of ports to regulate the effective pressure exerted by the liquid to resist the movement of the piston in both directions and proportional to its axial displacement from its normal position.

5. A shock absorber comprising a cylinder adapted to be mounted on the frame of a vehicle, a shaft extending axially of said cylinder and operatively connected exterior the same with the axle of the vehicle, a piston mounted in said cylinder and operatively connected with said shaft to shift in either direction with the rotation of said shaft in corresponding directions, said piston having a plurality of sets of ports therethrough connecting the spaces on opposite sides thereof, said spaces being filled with a liquid acting to oppose the shifting of said piston, a pair of valve plates journalled on said piston to bear against opposite faces thereof and each having a set of slots adapted to register with one set of ports in said piston and marginal lugs adapted to engage helical grooves cut in an annular surface within said cylinder, whereby the rotation of said shaft in either direction imparts a corresponding axial displacement of said piston and a relative rotation of said valve plates and the displacement of their slots to vary the combined area of the ports and effect a corresponding variation in the pressure exerted by the liquid against the piston proportional to its displacement from its normal position.

6. A shock absorber comprising a cylinder adapted to be mounted on the frame of a vehicle, a shaft extending axially of said cylinder and operatively connected exterior the same with the axle of the vehicle, a piston mounted in said cylinder and having a helical tongue and groove connection with said shaft, said piston having a plurality of sets of ports therethrough connecting the spaces on opposite sides thereof, said spaces being filled with a liquid acting to oppose the shifting of said piston, a pair of valve plates journalled on said piston, each having a set of slots adapted to register with one set of ports in said piston and marginal lugs adapted to engage helical grooves cut in the inner surface of said cylinder, whereby the rotation of said shaft in either direction imparts a corresponding axial displacement of said piston combined with a relative rotation of said valve plates to vary the combined area of the ports and effect a corresponding variation in the pressure exerted by the liquid against the piston proportional to its displacement from its normal position.

7. A shock absorber comprising a cylinder adapted to be mounted on the frame of a vehicle, a shaft extending axially of said cylinder and operatively connected exterior the same with the axle of the vehicle, a piston mounted within said cylinder and having a helical tongue and groove connection with said shaft whereby the same is shifted axially with a rotative movement by the rotation of said shaft, said piston having sets of ports therethrough connecting the spaces on opposite sides thereof, said spaces being filled with a liquid, a valve plate journalled on said piston and having a plurality of slots in concentric alignment with corresponding ports in said piston, and lugs engaging helical grooves in an annular surface within said cylinder, whereby the rotation of said shaft imparts a relative rotation of said piston and valve plate, thereby varying the combined area of said ports proportional to the displacement of the piston in either direction from its normal position.

8. A shock absorber comprising a cylinder adapted to be mounted on the frame of a vehicle, a shaft extending axially of said cylinder and operatively connected exterior the same with the axle of the vehicle, a fixed sleeve extending axially of said cylinder and surrounding said shaft, a piston mounted within said cylinder and having a helical tongue and groove connection with said shaft through slots cut in said sleeve, whereby said piston is shifted axially with the rotation of said shaft, said piston having sets of ports therethrough connecting the spaces on opposite sides thereof, said spaces being filled with a liquid. a valve plate journalled on said piston and having a plurality of slots in concentric alignment with corresponding ports in said piston, and lugs engaging helical grooves in the outer surface of said sleeve whereby the rotation of said shaft imparts a relative rotation of said piston and valve plate, thereby varying the combined area of said ports proportional to the displacement of the piston in either direction from its normal position.

DREW HEAD.